No. 813,633. PATENTED FEB. 27, 1906.
H. A. FARRAND.
CAMERA.
APPLICATION FILED JUNE 10, 1904.
2 SHEETS—SHEET 1.
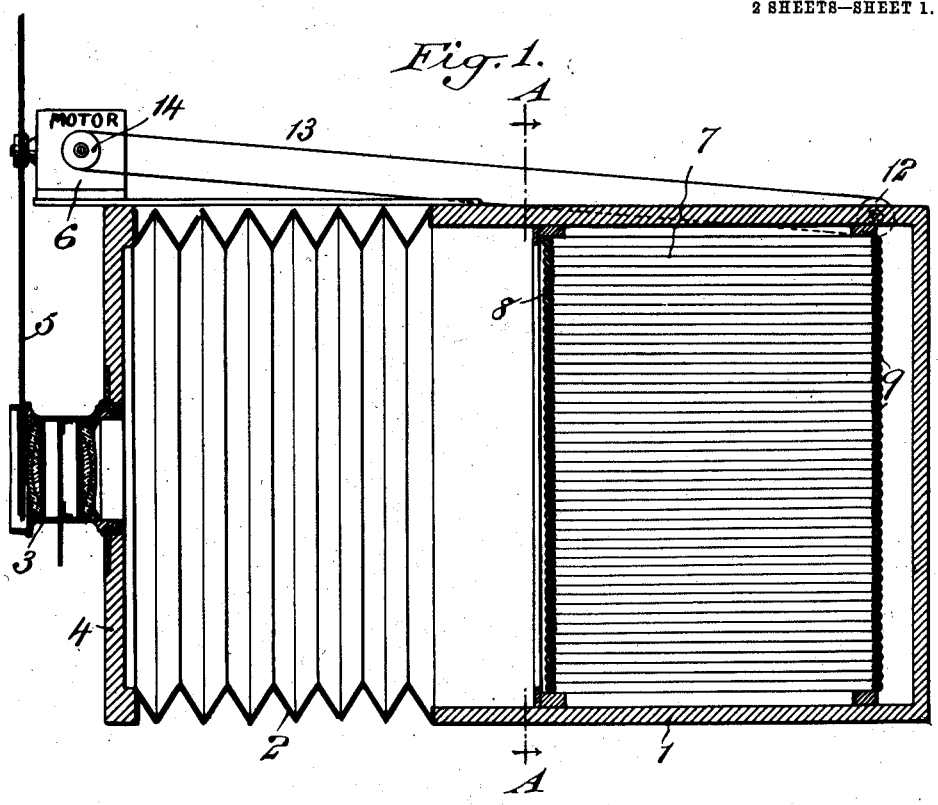
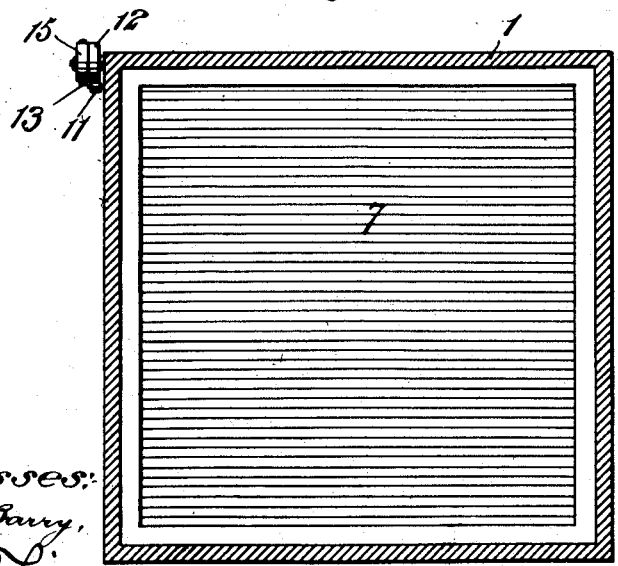
Witnesses:
F. George Barry,
Henry Thieme
Inventor.
Hiram A. Farrand
by attorneys No. 813,633. PATENTED FEB. 27, 1906.
H. A. FARRAND.
CAMERA.
APPLICATION FILED JUNE 10, 1904.
2 SHEETS—SHEET 2.
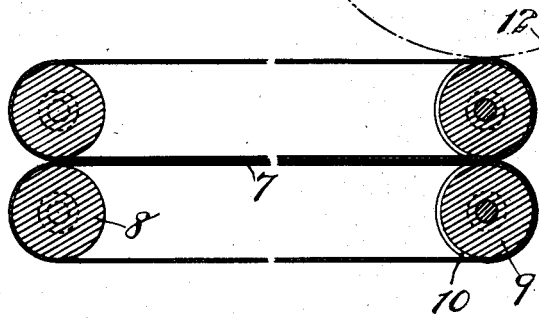
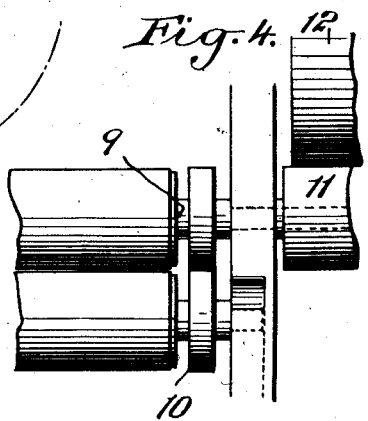
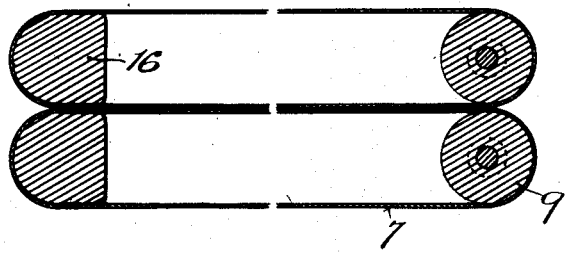
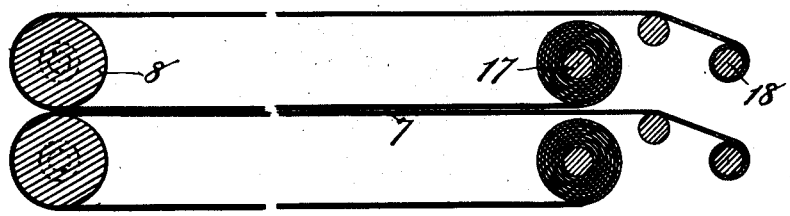
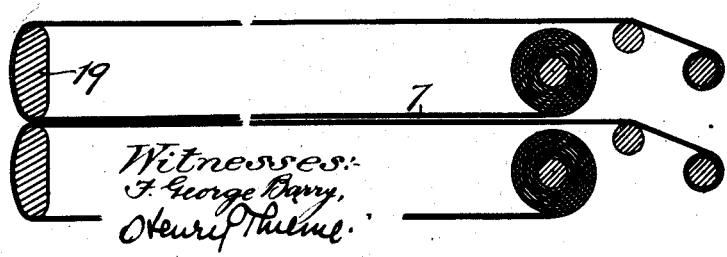

UNITED STATES PATENT OFFICE.

HIRAM A. FARRAND, OF NEW YORK, N. Y.

CAMERA.

No. 813,633.  Specification of Letters Patent.  Patented Feb. 27, 1906.

Application filed June 10, 1904. Serial No. 211,894.

*To all whom it may concern:*

Be it known that I, HIRAM A. FARRAND, a citizen of the United States, and a resident of the borough of Manhattan, in the city and State of New York, have invented a new and useful Improvement in Cameras, of which the following is a specification.

This invention has for its object to provide a plane composed of a plurality of separate sensitized surfaces combined with means for moving the surfaces into and out of the said plane.

This invention is primarily intended for use in the production of films to be treated for future use in apparatus for moving pictures—such, for example, as that shown in my copending application, Serial No. 163,686, filed June 30, 1903.

In apparatus for taking moving pictures it has been common to produce the entire impression upon each one of a successive series of films, each exposure being given to the entire exposed film. In my invention a plurality of sensitized surfaces—such, for instance, as sensitized films—are provided, a portion only of each film being exposed for each opening of the camera-shutter. The picture-receiving plane is thus composed of a plurality of sensitized surfaces, each surface having its proportional part of the picture presented to the plane.

In the accompanying drawings, Figure 1 represents my invention as applied to a camera, the view being taken in vertical central section. Fig. 2 is a transverse vertical section taken in the plane of the line A A of Fig. 1. Fig. 3 represents, on an enlarged scale in longitudinal vertical section, two endless moving films. Fig. 4 is a partial front view of the same. Fig. 5 represents in longitudinal vertical section two endless moving films having curved-faced blocks at their front ends rather than rollers. Fig. 6 is a similar view showing two films arranged to be unwound from one roller and wound onto another roller, the films at their front portions passing around rollers; and Fig. 7 is a similar view showing the films at their front portions passing around curved-faced slats.

The camera which I have shown herein comprises a rear box portion 1, a bellows portion 2, and a lens-casing 3 in the front 4 of the camera. A suitable shutter 5 is driven by a motor 6, carried by the camera, which shutter is arranged to open and close the lens at the proper intervals. In the camera-box 1 I provide a plurality of separate sensitized surfaces, which in the present instance are represented as films 7.

In the form shown in Figs. 1, 2, and 3 a vertical series of horizontal rollers 8 are mounted in proximity to each other and in alinement. Another series of horizontal rollers 9 are mounted at a distance back of the rollers 8, and around each pair of front and back rollers is passed one of the endless films 7. The means which I have shown for moving the different elements of sensitized surfaces into and out of the plane exposed to the lens is as follows: The rollers 9 are provided with friction-rolls 10, which engage each other. One of the rolls—in the present instance the top roll 9—is provided with a roller 11, which is frictionally driven from a large roller 12, which roller 12 is in turn driven from the motor 6 by means of an endless belt 13, which passes around a pulley 14 on the motor-shaft and a pulley 15 on the shaft of the roller 12. It is to be understood that the connection between the shutter 5 and the films is such that each time the shutter opens the camera-lens an unexposed surface of each of the films is brought into position in the picture-plane to receive an impression of the picture which is exposed by the lens.

If desired, a plurality of curved-faced blocks 16 might be provided for the front portions of the films instead of the rollers 8.

In Fig. 6 I have shown the films as being wound primarily upon rollers 17 to the rear of the rollers 8, the films passing from the rollers 17 around the rollers 8 and from thence back to rollers 18. These rollers 18 may all be driven in the same direction by any suitable driving connection. (Not shown herein.)

In Fig. 7 I have shown curved-faced slats 19 in place of the rollers 8.

While I have shown this plane composed of a plurality of separate sensitized surfaces in connection with the camera, it is to be understood that this plane might be used for printing thereon successive pictures by the well-known methods of photoprinting. After one print has been made the films may all be moved to bring unexposed portions into the plane for the printing thereon of another picture.

It will be seen that by my invention very accurate reproductions of scenes from life may be produced with a plurality of comparatively short films, it being clearly understood that each film only bears a portion of the total of each picture, all of the films being arranged to coact to complete the whole. After the films have been developed prints may be made therefrom for use in producing moving pictures.

It is evident that numerous changes might be made in the construction, form, and arrangement of the parts of the apparatus herein shown and described without departing from the spirit and scope of my invention. Hence I do not wish to limit myself to the forms shown herein; but

What I claim as my invention is—

1. A plurality of separate sensitized surfaces forming a continuous common plane and means for moving the surfaces into and out of said plane.

2. A plurality of sensitized surfaces forming a continuous common plane and means for simultaneously bringing predetermined portions of the surfaces into an exposed position for receiving an impression thereon.

3. In a camera obscura, the combination with a lens, of a plurality of sensitized surfaces located in the focal plane of the lens.

4. In a camera obscura, the combination with a lens, of a plurality of sensitized surfaces and means for moving the surfaces into and out of the focal plane of the lens.

In testimony that I claim the foregoing as my invention I have signed my name, in presence of two witnesses, this 8th day of June, 1904.

HIRAM A. FARRAND.

Witnesses:
FREDK. HAYNES,
LIDA M. EGBERT.